United States Patent [19]
Bilitza et al.

[11] Patent Number: 5,390,216
[45] Date of Patent: Feb. 14, 1995

[54] SYNCHRONIZATION METHOD FOR A MOBILE RADIOTELEPHONE

[75] Inventors: Herbert Bilitza; Biegfried Gartner; Hermann Neuner, all of Berlin, Germany

[73] Assignee: Robert Bosch GmbH, Stuttgart, Germany

[21] Appl. No.: 48,804

[22] Filed: Apr. 16, 1993

Related U.S. Application Data

[63] Continuation-in-part of Ser. No. 984,276, Dec. 1, 1992, abandoned, which is a continuation-in-part of Ser. No. 967,663, Oct. 28, 1992, abandoned.

[30] Foreign Application Priority Data

Nov. 2, 1991 [DE] Germany ............................ 4136147

[51] Int. Cl.$^6$ .............................................. H04L 7/00
[52] U.S. Cl. .................... 375/106; 375/111; 375/116; 370/105.1
[58] Field of Search ............... 375/106, 111, 114, 116, 375/118; 370/95.3, 100.1, 105.1, 106, 105.3; 379/58, 59

[56] References Cited

U.S. PATENT DOCUMENTS

| | | | |
|---|---|---|---|
| 4,852,090 | 7/1989 | Borth | 370/95.3 |
| 4,977,580 | 12/1990 | McNicol | 370/95.3 |
| 5,157,698 | 10/1992 | Hespelt et al. | 375/106 |
| 5,177,740 | 1/1993 | Toy et al. | 370/105.1 |

FOREIGN PATENT DOCUMENTS

3739481C2  6/1989  Germany .

OTHER PUBLICATIONS

Ferrel G. Stremler, Introduction to Communication Systems, Copyright 1982, 1977 by Addison-Wesley Publishing Company, Inc., pp. 571–603.
Recommendation GSM 05.02, Multiplexing and Multiple Access on the Radio Path, Version 3.4.1, Released by ETSI/PT 12; Release date: Jan. 1990, pp. 1–36.
GSM Recommendation 05.04, Modulation, Jan. 1990, 3 pages, Version 3.1.1, ETSI/GSM.
Recommendation GSM 05.10, Radio Sub-System Synchronization, Version 3.4.0, Released by ETSI/PT 12; Release date: Mar. 1990, pp. 1–6.

*Primary Examiner*—Stephen Chin
*Assistant Examiner*—Don Vo
*Attorney, Agent, or Firm*—Frishauf, Holtz, Goodman & Woodward

[57] ABSTRACT

The high requirements of digital mobile radiotelephone communication under the GSM Standard with respect to synchronization of a mobile radiotelephone to a fixed radiotelephone station is performed by frequently (four times per so-called baseband frequency cycle) sampling contemporary in-phase and quadrature phase components of received GMSK digital signals and utilization of time slots respectively containing a frequency correction burst, a normal burst and an extended synchronization burst, respectively for initial synchronization, normal maintenance of synchronization during communication and a background procedure during normal operation. The decoding of the GMSK signal provides one-bit of information from each pair of in-phase and quadrature components sampled. The sampling of in-phase and quadrature components greatly simplifies the synchronizing procedure. Initial synchronization includes coarse frequency synchronization, coarse frame synchronization, fine frequency synchronization and fine frame synchronization. Normal maintenance of synchronization consists fine frame synchronization with fine frequency synchronization and a data signal preliminary processing. Extended synchronization consists of coarse frame synchronization and a fine frame synchronization with fine frequency synchronization.

13 Claims, 5 Drawing Sheets

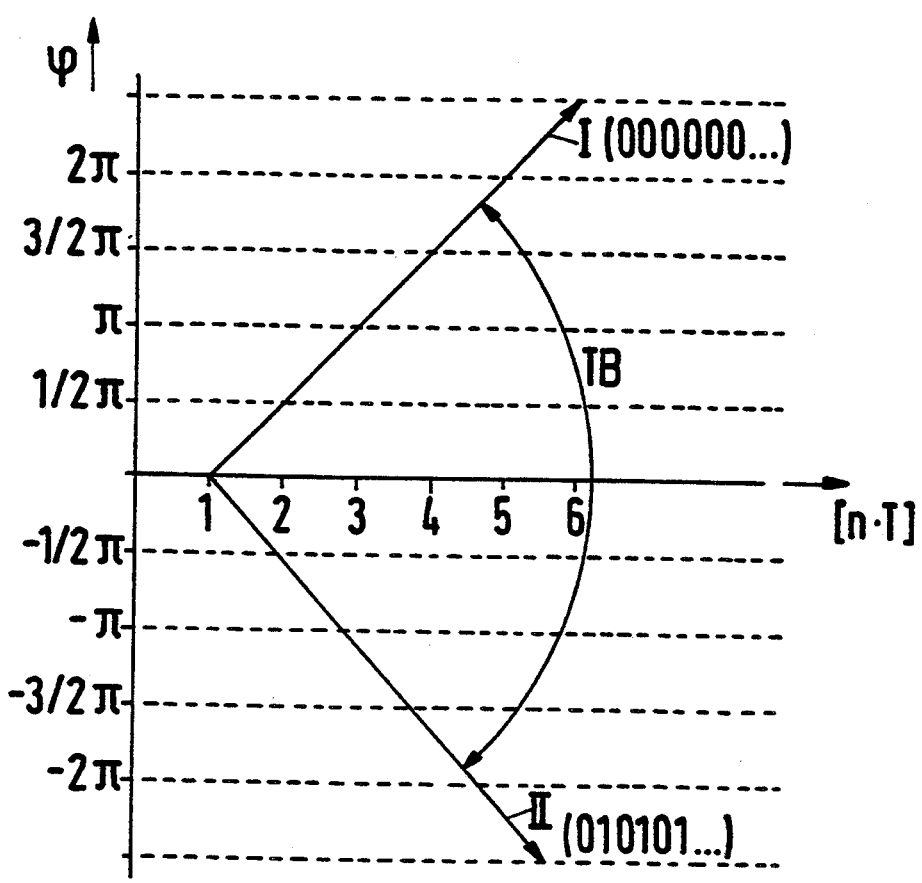

SYNCHRONIZATION METHOD FOR A MOBILE RADIOTELEPHONE

This application is a continuation in part of application Ser. No. 07/984,276, filed Dec. 1, 1992, now abandoned which was a continuation in part of application Ser. No. 07/967,663 filed Oct. 28, 1992, now abandoned.

This invention is in the field of synchronization methods for mobile radiotelephones in a cellular, digital mobile radiotelephone system comprising a plurality of fixed stations and a plurality of mobile radiotelephones, for example operating according to what is known as the GSM Recommendation.

A known digital mobile telephone system according to the GSM Recommendation requires a relatively great complication and expense for the synchronization of a mobile radiotelephone which is necessary to fulfill the strict requirements pertaining to the transmission of digital information.

BACKGROUND AND PRIOR ART

The digital mobile telephone system which forms the basis for the so-called D-Network used in Germany is generically designated by the acronym GSM, which comes from the French phrase for mobile special group (GROUPE SPECIALE MOBILE). In this system the radio transmission is purely digital, hence the name D-Network. It is a cellular network in the sense that there are many fixed stations with which a mobile station can communicate sequentially as it moves from the cell of one station to the cell of the next.

The receiving frequency region reserved for the D-Network stretches from 935 to 960 MHz and is sub-divided into 124 receiving channels each having a 200 kHz bandwidth. Each such frequency band is organized to provide eight participant channels in a time multiplex raster in which the individual time slots are similarly organized frame by frame.

As described in GSM 05.02, released January 1990, there are traffic channels (TCH's) and control channels. The former were sub-divided into encoded speech traffic channels and data traffic channels.

The control channels include frequency correction channels for frequency correction of a mobile station, synchronization channels for a frame synchronization of the mobile station and identification of a base transceiver station and broadcast control channels for general information from a base station. The latter may be organized as common control channels with certain blocks in each common control channel reserved for access grant messages.

A particular set of radio frequency channels is allocated to a particular cell, such a set being defined as the cell allocation (CA). One radio frequency channel of the cell allocation is used to carry synchronization information, known as the BCCH carrier, and serves as the broadcast control channel. A subset of the cell allocation allocated to a particular mobile station is designated as the mobile allocation (MA). A radio frequency channel is partitioned into time slots, so that transmission takes place in time division multiple access (TDMA) frames. There are eight time slots to a TDMA frame, which has a duration of a little less than 5 ms. At a base station the start of a TDMA frame on the uplink is delayed by the fixed period of three time slots from the start of the TDMA frame on the down link, while at a mobile station this delay will be variable to allow adjustment for a signal propagation delay. This adjustment is referred to as adaptive frame alignment.

With the above general information, a known synchronization system incorporated in GSM recommendation 05.10 can now be described.

A base station sends signals on a broadcast control channel to enable a mobile station to synchronize itself to the base station and if necessary correct its frequency standard so as to put it in line with that of the base station. The signal sent by the base station for these purposes are (a) frequency correction bursts and (b) synchronization bursts. A burst is defined as an interval within which the radio frequency carrier is modulated by a predetermined data stream. For such data a time slot is divided into 156.26 bit periods and the bits are numbered so that the timing of a burst within a time slot can be defined in terms of bit number. GSM 05.02 defines four full bursts of a useful duration of 147 bits and one short burst of a useful duration of 87 bits. The document just mentioned shows that a frequency correction burst (FB) begins with three tail bits, follows with 142 fixed bits and three more tail bits, with the remainder of the time providing a guard interval. The tail bits are zeroes and the "fixed bits" also, so that this burst is equivalent to an unmodulated carrier with a frequency offset above the nominal carrier frequency.

A synchronization burst begins with three tail bits, followed by 39 encrypted bits and then 64 extended training sequence bits, followed by encrypted bits, tail bits and a guard interval. The extended training sequence bits are a particular pattern of ones and zeroes.

The timing of time slots, TDMA frames, traffic channel frames and control channel frames are all related to a common set of counters which run continuously whether the mobile station and base station are transmitting or not. Thus once the mobile station has determined the correct setting of these counters all its processors are synchronized to the currently serving base station. The mobile station times its transmissions to the base station in line with those received from the base station. The base station sends to each mobile station a timing advance parameter according to the perceived round trip propagation delay. The mobile station advances its timing by this amount, with the result that signals from different mobile stations arriving at the base station are compensated for propagation delay.

The timing state of the signals transmitted is defined by the following counters:
quarter bit number QN (0-624)
bit number BN (0-156)
time slot number TN (0-7)
TDMA frame number FN (0-22715647)

QN increments every 12/13 microsecond, BN is the integer part of QN/4, TN increments whenever QN changes from count 624 to 0 and FN increments whenever TN changes from count 7 to 0.

The mobile station can use a timing of the receipt of the synchronization burst to set up its time base counters as follows:
QN is set by the timing of the training sequence,
TN=0 when the sync burst is received, has a particular value (set forth in GSM rec. 05.10 page 3) when the sync burst is received.

GSM recommendation 05.10 pages 4 and 5 sets very strict requirements regarding the carrier frequency transmitted by the mobile station and the accuracy to which the mobile station shall keep its internal time base in line with that of signals received from the base station.

SUMMARY OF THE INVENTION

It is an object of the invention to provide a synchronization method that fulfills all the requirements of digital information transmission with the least possible technical complication and expense.

The synchronization method of the invention is based on the evaluation of a continuously running phase angle, which is calculated again and again from an in-phase component I and a quadrature component Q. The type of modulation used in the D-Network is Gaussian minimum shift keying (GMSK), in which a linear filter having a pulse response of Gaussian shape continuously reproduces discontinuous transitions from one to the other of the frequency modulation waves and thereby provides a saving of transmission bandwidth by providing continuity in place of the discontinuities of the transitions. The resulting transition wave form can be resolved into varying contents of I and Q components, relative, for example, to one of the two symbol (bit value) frequency waves.

Briefly, in order to take advantage of that more economical synchronization technique, there is performed for the mobile radiotelephone, first, an initial synchronization, then a normal synchronization and then, an extended synchronization as a background procedure during normal operation. The initial synchronization is divided into following steps:

(1.1) coarse frequency synchronization,
(1.2) coarse frame synchronization,
(1.3) fine frequency synchronization, and
(1.4) fine frame synchronization.

The normal synchronization comprises the steps of:

(2.1) frame synchronization with fine frequency synchronization and
(2.2) a preliminary processing of a data signal. The extended synchronization comprises of
(3.1) a coarse frame synchronization and
(3.2) a fine frame synchronization with fine frequency synchronization.

By this procedure it is possible to realize synchronization of higher precision with a relatively small complication and expense.

The method of the invention is based on evaluation of phase angle many times per bit interval. An evaluation is calculated from each of the individual I,Q value pair samples. By such means the synchronous condition is very rapidly reached.

It is also possible, in accordance with the invention, for the precision of the coarse frequency synchronization to be variable across the phase tolerance region (TR). It can be useful in the practice of the invention for the upper boundary phase value to be represented by the binary sequence 0000. . . and the corresponding lower boundary for the phase angle by the binary sequence 0101. . . , these sequences being continued for a number of bits which depends on the desired resolution of phase angle measurement.

It is also useful for the coarse frame synchronization to take place by evaluation of a frequency correction burst and, also, to perform that evaluation from the phase difference values of neighboring paired phase values by a linear regression of a regulating magnitude proportional to the frequency shift.

BRIEF DESCRIPTION OF THE DRAWINGS

Further details of the invention are described below by way of illustrative example with reference to the annexed drawings, in which:

FIG. 3 is a graph showing the course of opposite extreme phase values, plotted against a digital bit sequence at the sampling rate rhythm.

DESCRIPTION OF THE ILLUSTRATIVE EMBODIMENTS

As is evident from the explanation above, the relative size of contemporary I and Q components of a GMSK wave provides a series of phase angles that identifies a rate of change of phase angle that progresses at a known rate when the tuning is of a received signal that is in synchronism with a transmitted signal, regardless of the modulation of a GMSK wave. The relative magnitudes of the I and Q components will change when sampled at many times per data bit length. The relative I and Q magnitudes (i.e. the proportion) in each case define a phase angle. Transitions from 0 to 1 and from 1 to 0 of GMSK modulation, as well as synchronization procedures, result in changing phase angles. Comparison of the phase angles calculated from successive I, Q sample value pairs with a reference phase angle which advances by 90° per MSK data bit interval, which is readily calculated in parallel, provides an error signal for maintaining synchronism of the mobile station frequency with the base station frequency.

Figure 1:
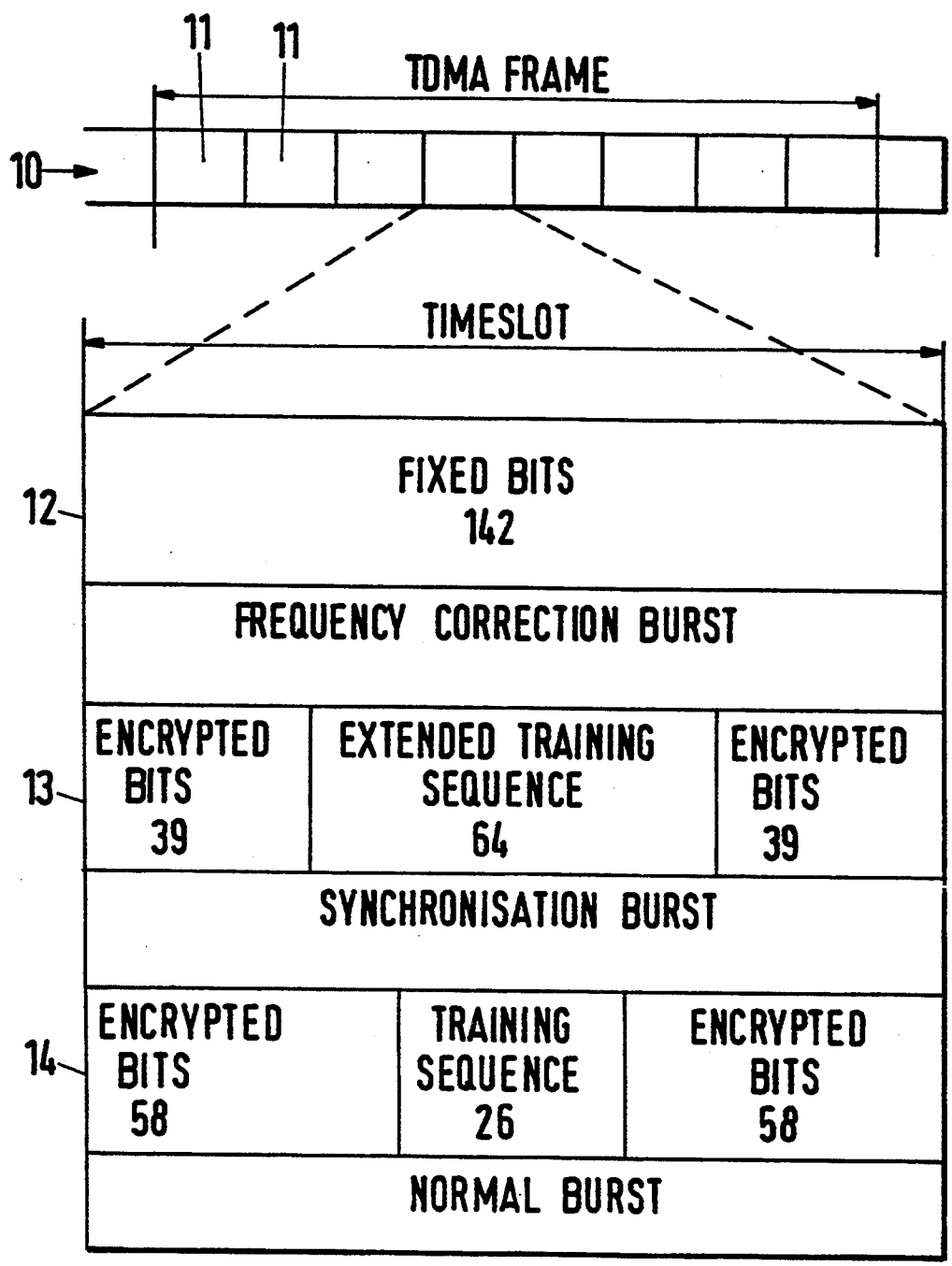
FIG. 1 is a schematic representation of the data structure of a TDMA frame during sync time slots providing for a frequency correction burst 12, an extended sync burst 13 and a normal burst 14.

As shown in FIG. 1, a Time Division Multiple Access (TDMA) frame 10 contains eight time slots 11. This complies with GSM recommendation 5.02.

Figure 2:
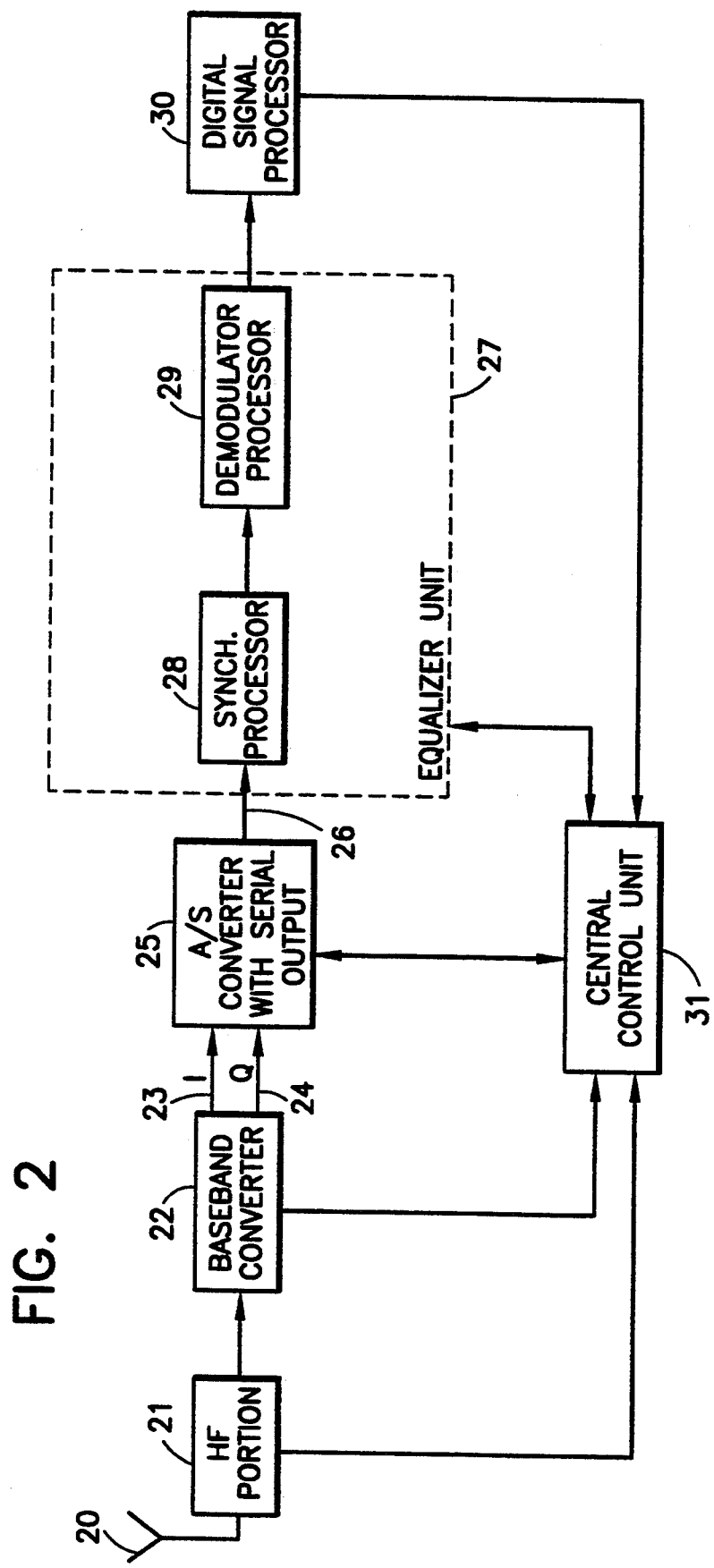
FIG. 2 is a circuit block diagram of a receiver-and-equalizer unit of a mobile radio communication station.

It is desirable to explain the basic construction of the receiving portion of a mobile telephone, with reference to the block circuit diagram of FIG. 2 before further describing the course of the synchronization procedure.

In FIG. 2 there is schematically shown a radio antenna 20 connected to the input of a high frequency reception portion 21 of a radio receiver. A baseband converter 22 is connected to follow the output of the high frequency reception portion and has two outputs 23 and 24 respectively for the I and Q signal voltages. These two outputs are connected to corresponding inputs of an analog-to-digital converter 25 which has an output 26 that deliver a serial digital data signal. This output 26 is connected with an input of an equalizer unit 27 which consists of a synchronization processor 28 and a distortion-compensating and demodulating processor 29. Following the equalizing unit 27 there is connected a signal processing unit 30. A central control unit 31 is in two-way connection with the stages 21, 22, 25, 27 and 30.

The manner of operation of the mobile radiotelephone shown in FIG. 2 is as follows. After the multiple-stage high-frequency conversion of the received signal in the high frequency receiving portion 21 and a transformation into the baseband by means of the baseband converter 22, the I and Q components are sampled at a frequency of 270.833 kHz and quantized into eight bit digital signals in the analog-to-digital converter 25. Only a few of the available 8 bits are necessary for GMSK demodulation. In demodulation performed in a Viterbi decoder, for example, only one bit is obtained for each sampled I, Q pair for producing a serial digital data stream ready for further processing, that being sufficient for practical operation. All the synchronization routines which take place with the help of the synchronizing processor 28 are based on the processing of the phase angles calculated from the I and Q components.

The central control unit 31 prescribes to the synchronization processor 28 which synchronization step is to be activated. The control unit reads out the responses of the synchronization processor, interprets them and supplies the setting values to the corresponding components, as for example a correction for a local oscillator.

The initial synchronization (FIG. 1), which serves to provide the initial connection between a mobile radiotelephone and a fixed station, includes four steps:

(1.1) coarse frequency synchronization,
(1.2) coarse frame synchronization,
(1.3) fine frequency synchronization, and
(1.4) fine frame synchronization.

Coarse Frequency Determination and Coarse Frequency Synchronization (1.1)

The coarse frequency determination has a burst-independent operation and can thus be subjected to a first frequency estimation after the detection of a carrier frequency by means of the high frequency reception portion 21 of the radio receiver. The result produces information of whether the frequency of the discovered carrier lies within or outside of a tolerance region TR (compare FIG. 3). The maximal tolerance region is determined by the absolute phase course, with limits respectively resulting from a permanent binary sequence I of the logical value 0, on the one hand, and an alternating binary sequence II of the logic values 0 and 1, with reference to a fixed measurement time. The tolerance region is variable, so that the precision of the frequency estimation increases with a shrinking of the region for any particular data stream (compare FIG. 3 again). With sufficient precision of carrier frequency tuning the coarse frequency determination which is burst-independent can be dispensed with; in consequence the synchronization steps designated 1.2, 1.3 and 1.4 above then suffice for the initial synchronization.

Coarse Frame Determination and Frame Synchronization (1.2)

In the next synchronization step, the coarse frame determination, it is necessary to detect approximately the frame beginning for a particular channel. For this purpose the frequency correction burst 12 (FIG. 1) is used. The term "burst" is used in the same sense as in GSM 05.02, signifying a transmission occupying a single time slot. Preceding the active part of every burst are "dummy" bits 111. . . 1 and 3 tail bits 000. These are provided in reverse order after the active part (see GMS rec. 0504). These make sure that the active part of the burst are correctly evaluated. The frequency correction burst has 142 fixed identical bits which signify a phase course, (taking account of and correcting phase progression., rotating N times to reach $N \cdot 2\pi$) having a continuous phase rise by 90° per sample value pair I, Q at the nominal baseband signal frequency (which is desirably the I, Q sampling frequency). Without taking account of continuing phase rotation cycle after cycle, the calculated phase angles in the region from 0 to $2\pi$ will have a phase difference of $\pi/2$ between successive I and Q pairs phase values. In that way a simple criterion for the search algorithm for recognition of the beginning of the frequency correction burst 12 is provided, as shown in FIG. 5.

Figure 5:
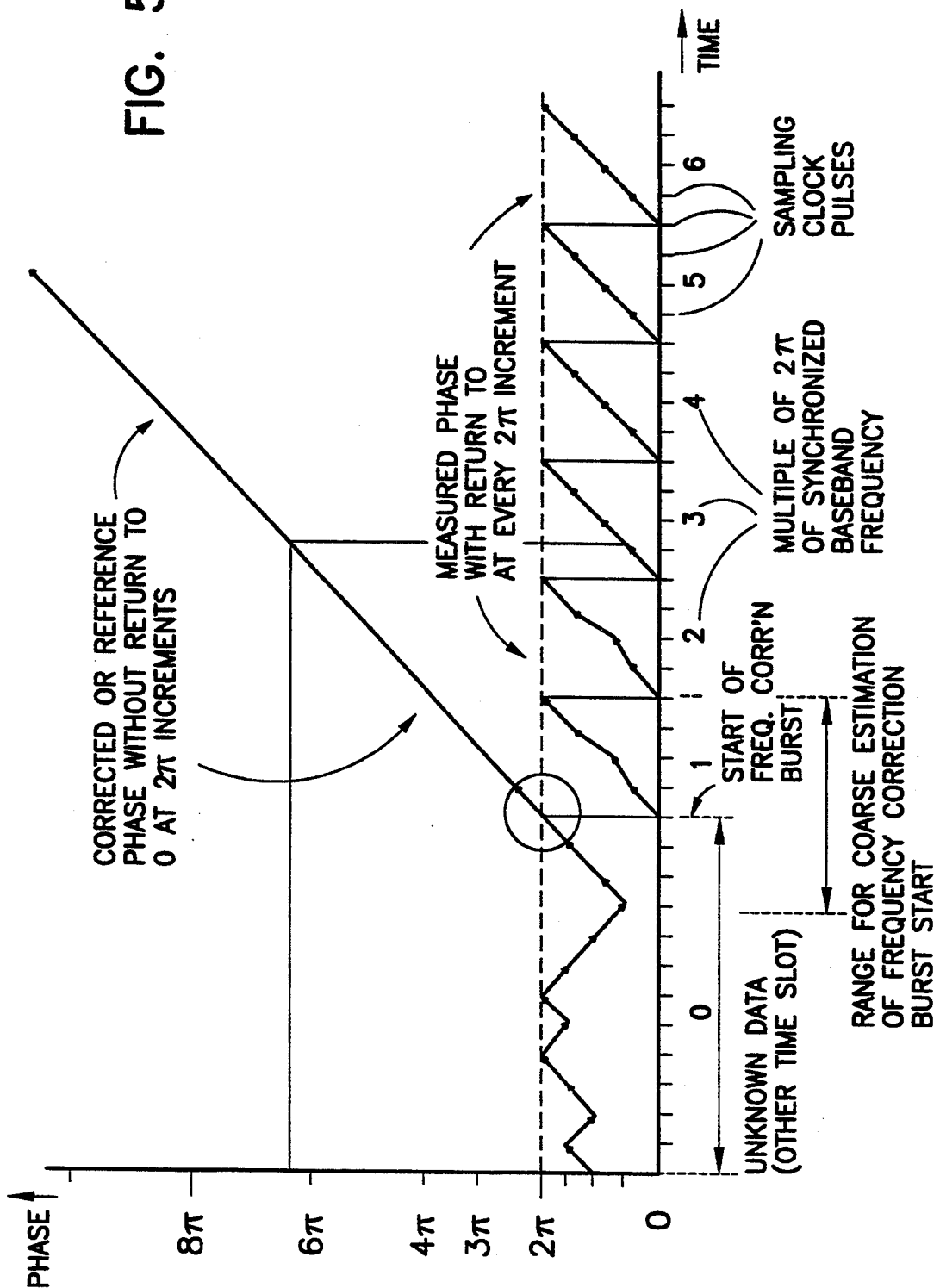
FIG. 5 is a graph of a corrected phase course of a frequency burst.

FIG. 5 shows how the corrected phase course of the received frequency correction burst 12 makes possible the determination of the beginning of a frame. The vertical phase scale is graduated at the bottom in steps of $\pi/2$ radians and at higher levels with specifically designated steps of $\pi$ or $2\pi$ with even-integer multiples $2\pi N$ specifically designated. The horizontal scale is finely graduated in sampling instants of I, Q values and also shows the sets of four successive sampling pulses corresponding to a $2\pi$ phase change (complete cycle) of the nominal baseband signal frequency. Each $2\pi$ cycle is designated by a numeral (1,2,3. . . ) for successive values of N on the horizontal axis.

At the left are unrecognized or unknown data, during which no significant values are found and there N is shown as N=0. When the burst is recognized in the intervals N=1 and N=2, there are fluctuations in the rate of change of phase (poor synchronism) but these are quickly corrected to produce the necessary straight line corresponding to the known linear phase progressive characteristic of the burst.

The sample values repeat every $2\pi$, in straight lines after the correction is made, and then correspond to the steadily rising phase of the burst, as shown in FIG. 5. That steadily rising line can be calculated back to show that the burst began at the beginning of the interval marked 1 in FIG. 5. The time region for the coarse estimation of the beginning of the burst is shown below the FIG. 5 graph. From the beginning of the burst, the beginning of a TDMA frame can be determined with reference to the time slot assigned to the mobile telephone, when necessary.

When the I and Q components are measured, the received signal has been converted to the baseband, in which the GMSK frequency modulation represents serial digital data, in which speech or other intelligible data has been encoded. The nominal GMSK carrier frequency, presumably corresponding to a frequency correction burst offset, can desirably be selected, as mentioned above, to generate the sampling rate at four times that nominal frequency for the I, Q measurement pairs, as is shown to be the case in the example of FIG. 5. The corrections necessary for frequency and phase synchronization may utilize more than one bit of information resulting from an I and Q sample pair. This may multiply the output bit rate of the unit 125 of FIG. 1 and may be implemented by parallel serial outputs.

Fine Frequency Determination and Fine Frequency Synchronization (1.3)

After a successful determination of the beginning of a frame, the oscillator frequency of the mobile telephone needs to be brought more precisely (0.1 ppm) into step with the frequency of the base station. The frequency correction burst 12 is therefore again used, which corresponds to a purely sinusoidal signal lasting for one time slot, of which the continual phase course, from sample pair value to sample pair value, rises by π/2 at the nominal frequency.

The algorithm for frequency determination yields the actual phase value from the I,Q sample value pair and provides the difference from the above described reference phase value 90°*−n, in which n, by which 90° is multiplied, is the number of sample pairs. That reference value is calculated in parallel to the actual value determinations. The minimization of the phase difference by a linear regression produces a magnitude proportional to the frequency shift via the slope of the regression straight line. Linear regressions are explained in *Mathematical Methods for Digital Computers* by A. Ralston and H. S. Wilf, published by John Wiley & Sons and in the HP-15C User Manual available from Hewlett-Packard.

Fine Frame Determination and Frame Synchronization (1.4)

The fine frame determination for the bit-precision frame synchronization takes place by the recognition and evaluation of the training sequence in the synchronization burst 13 (FIG. 1 and GSM 05.02 p. 11). A bit-accurate frame determination is possible by a pattern correlation procedure. Correlation is explained in "Digital Communications" by Berndt Sklar (Prentice Hall), a book of the same title by John G. Proakis (McGraw Hill) and "Information Transmission Modulation and Noise" by M. Schwartz (McGraw Hill). The capture region for the frame detection lies in a range of about plus or minus 40 sample pulses. The measurement magnitude corresponds directly to the setting magnitude for bit synchronization required by the central control unit 31.

Figure 4A:
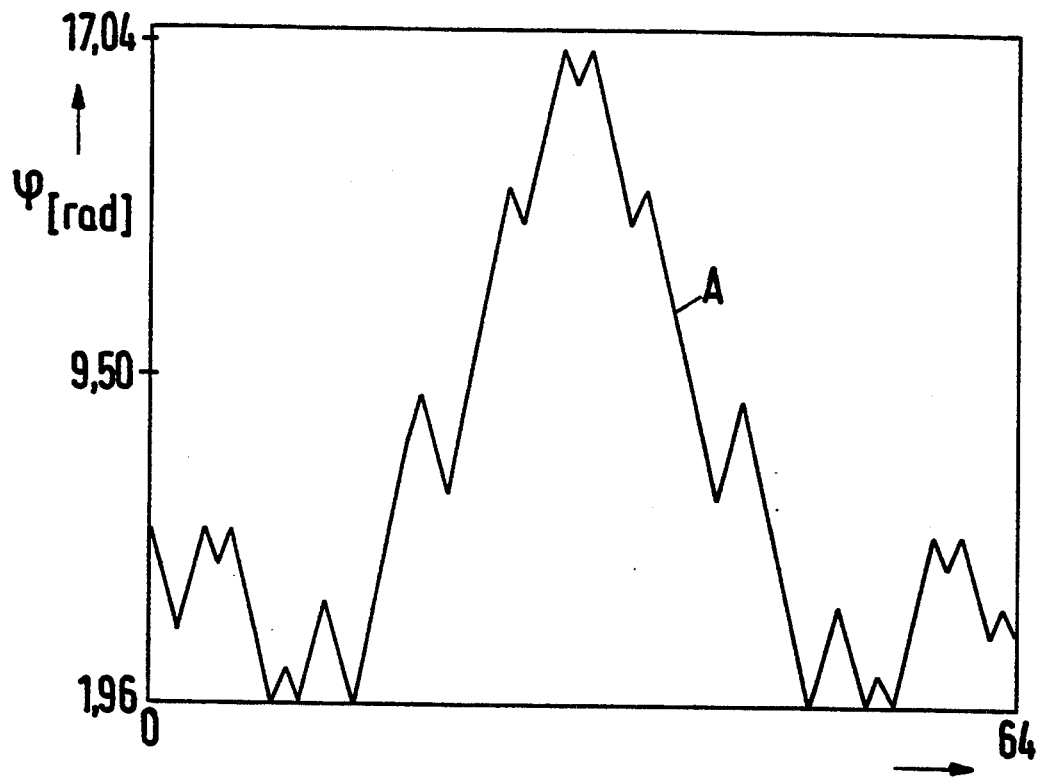
FIG. 4A and FIG. 4B respectively show the theoretically determined phase course (A) and a measured phase course (B) of an extended training sequence of a synchronization burst identified in FIG. 1.
Figure 4B:
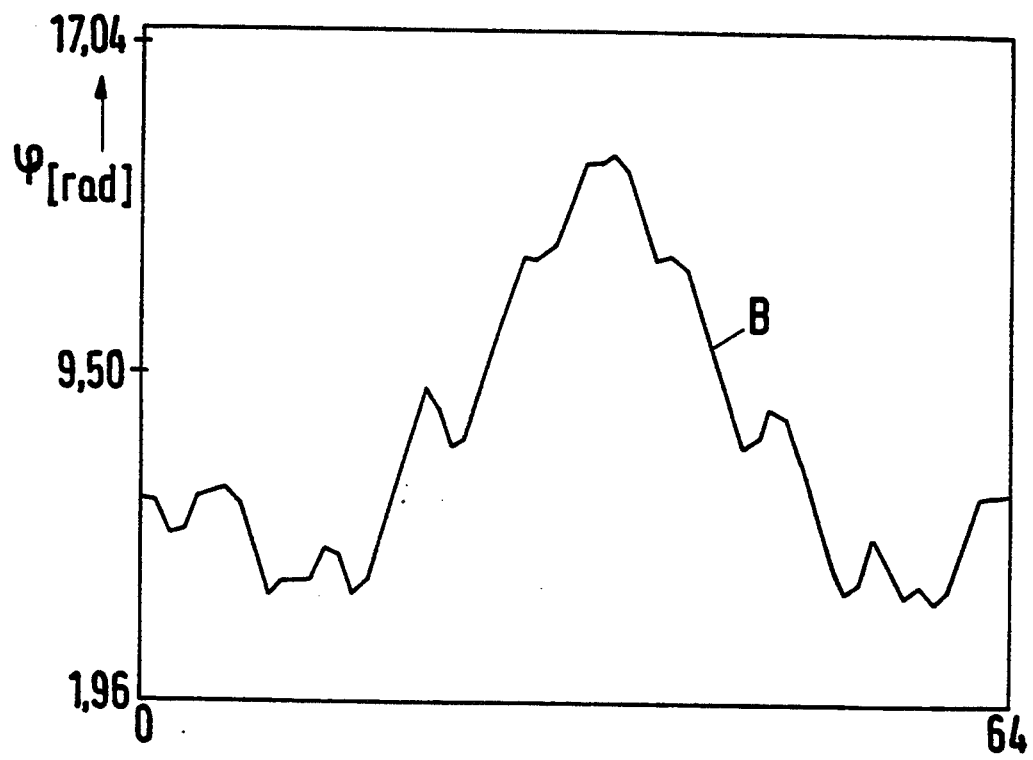

FIGS. 4A and 4B show the phase course of the training sequence within the synchronization burst 13. FIG. 4A shows this phase course A as theoretically calculated and FIG. 4B shows this phase course B as measured (at the output of the analog-to-digital converter 25) and calculated from the measured I,Q sample values.

Normal Synchronization (2)

The normal synchronization during operation of the receiver takes place in two steps:
2.1 frame synchronization with fine synchronization
2.2 data signal preliminary processing With continuous monitoring and maintaining of the frame and frequency synchronism by the evaluation of training sequence within the normal burst 14 (FIG. 1 and GMS 05.02 p. 10) an error free decoding is assured. The encrypted bits designated in FIG. 1 serve to identify the training sequences. In this procedure any frame shift is first determined. The value produced (timing pulse shift) is a necessary parameter in order to mark the pattern sequence with bit-accuracy within the data packet or sentence. This is assumed for the following correct calculation of the correlation for determining the actual (current) frequency status.

Preliminary Data Processing (2.2)

A frequency correction value produced by the central control unit 31 from the actual (current) frequency measurement is supplied to the synchronization processor 28. By means of this preprocessing of the data signal any impairment of error-free decoding in the case of frequency shifts exceeding 200 Hz is completely eliminated. Such frequency shifts are to be expected from the Doppler effect and from oscillator drift.

Extended Synchronization (3)

Extended synchronization is needed to provide synchronization of a mobile radiotelephone to neighboring cells of a cellular mobile radio communication system as a cell boundary is approached and crossed. It is also carried out in two steps:
3.1 coarse frame synchronization
3.2 fine frame synchronization with fine frequency synchronization.

By means of this extended synchronization certain special cases of initial synchronization are avoided. In this case it is basically assured that upon leaving one radio cell the base station of that cell will not interfere with the continuation of the connection.

In order to assure that synchronization is not lost during a change of a radiotelephone from one radio cell to a neighboring radio cell, extended synchronization is provided in normal operation as a background procedure (process having lower priority) which produces the necessary synchronization parameters (frame and frequency shift) for the nearby cell in contemplation of a crossing of a cell boundary. As a result, the control unit 31 can assure that a connection will be preserved in going from one cell to another. In particular, the synchronization procedure during normal operation performs a coarse frame synchronization (frequency burst beginning) and a fine frame synchronization with fine frequency synchronization in which the synchronization burst 13 is used for the frame and frequency synchronization.

The relevant algorithms for the above steps correspond essentially to those designated 1.2, 1.3, 1.4 and 2.1 above, although more bits are involved in the extended training sequences (FIG. 1).

By measuring phase angles, especially at four times the frequency of a nominal baseband frequency which carries GMSK modulation, and comparing them with a locally generated comparison signal of steadily increasing phase angle, a mobile radio station can utilize the frequency burst signals transmitted by a base radio station much more economically to synchronize a mobile radio station with a base station for receiving and transmitting than by means of maintaining mobile time base counters as recommended by GSM rec 05.10. For taking best advantage of evaluating phase angles by I. Q samples, it is important to utilize the various different transmitted synchronization bursts in accordance with the various steps that usefully make up the various aspects of the invention.

The invention is not necessarily limited to the GSM system or the D Network and is likely to be useful in more or less similar systems that may be used now or in the future.

Although the invention has bee described with reference to a particular illustrative example, therefore it will be understood that variations and modifications are possible within the inventive concept.

We claim:
1. A method of synchronizing a mobile radiotelephone in a cellular digital mobile radiotelephone network comprising a plurality of fixed radiotelephone stations and a plurality of mobile radio stations operating in accordance with a GSM standard or its equivalent, in which each communication frequency assignment is subdivided into interleaved time slots, a plural- ity of said time slots together comprising a frame, comprising the following steps which are carried out in the mobile radiotelephone:

(1) conducting an initial synchronization by means of a frequency correction burst substantially fully occupying a time slot with an unmodulated wave corresponding to repetition of bits of the same binary logic value;

(2) maintaining normal synchronization during communication by means of interspersed normal synchronization bursts, each normal synchronization burst containing a training sequence occupying less than a third of a time slot, and (3) performing extended synchronization during communication as a background procedure by means of interspersed frequency synchronization bursts, each frequency synchronization burst containing an extended training sequence occupying less than an entire time slot and more than a third of a time slot, and wherein:

said step of conducting said initial synchronization comprises the substeps of:

(1.1) conducting a coarse frequency synchronization, (1.2) conducting a coarse frame synchronization over a plurality of said time slots which comprise a frame, (1.3) conducting a fine frequency synchronization, and (1.4) conducting a fine frame synchronization over said plurality of time slots which comprise a frame;

said step of maintaining said normal synchronization comprises the substeps of:

(2.1) conducting a frame synchronization with fine frequency synchronization, and (2.2) carrying out preliminary data signal processing; and said step of performing said extended synchronization comprises the substeps of:

(3.1) conducting a coarse frame synchronization, and (3.2) conducting a fine frame synchronization with fine frequency synchronization.

2. The synchronization method of claim 1, wherein there is performed in the mobile radiotelephone the further steps of:

calculating (continuous evaluation of) a phase angle from sequences of pairs of values each including an in-phase value (I) and a quadrature value (Q); and thereafter performing a continuous evaluation of said calculated phase angle.

3. The synchronization method of claim 2, wherein the precision of said coarse frequency synchronization step is variable by setting a phase tolerance region (TR).

4. The synchronization method of claim 3, wherein said phase tolerance region (TR) has a maximum value provided by a phase angle corresponding to an upper phase value represented by a binary bit sequence 0000. . . and a lower phase value represented by a binary bit sequence 0101. . . .

5. The synchronization method of claim 2, wherein the fine frequency synchronization step comprises evaluating said frequency correction burst (12).

6. The synchronization method according to claim 5, wherein the step of evaluating said frequency correction burst (12) for fine frequency synchronization comprises by producing a regulation magnitude proportional to a frequency deviation from phase difference values of neighboring phase values by means of a linear regression.

7. The synchronization method of claim 2, wherein the step of fine frame synchronization comprises a step of recognizing and evaluating said extended training sequence of said frequency synchronization bursts.

8. The synchronization method of claim 7, wherein the step of recognizing said extended training sequence comprises conducting a pattern correlation procedure on said frequency synchronization bursts.

9. The synchronization method of claim 2, wherein the step of conducting said frame synchronization with fine frequency synchronization comprises recognizing and evaluating said training sequence within a normal synchronization burst (14).

10. The synchronization method of claim 2, wherein the step of conducting said frame synchronization comprises conducting a pattern correlation procedure and initial frequency synchronization by evaluating said frequency correction burst by producing a regulation magnitude proportional to frequency deviation for a central control unit from phase difference values of neighboring phase values by means of a linear regression.

11. The synchronization method of claim 2, wherein said extended synchronization takes place with reference to neighboring cells during normal radio communication by means of a coarse frame synchronization and thereafter a fine frame synchronization with fine frequency synchronization by recognizing and evaluating said extended training sequence of said frequency synchronization burst (13).

12. The synchronization method of claim 11, wherein the step of performing said extended synchronization is carried out at a lower priority with respect to normal synchronization during communication.

13. The synchronization method of claim 2, wherein said step of preliminary data signal processing during said step of maintaining normal synchronization comprises preliminary processing of said in-phase (I) and quadrature phase (Q) sample values for eliminating a frequency offset.

* * * * *